United States Patent [19]
Diamantstein et al.

[11] Patent Number: 5,404,547
[45] Date of Patent: Apr. 4, 1995

[54] SYSTEM FOR STORING DIFFERENT CATEGORIES OF ROUTINES IN INTERNAL AND EXTERNAL MEMORIES RESPECTIVELY AND EXECUTING THE ROUTINES BASED UPON IMPACT BY GENERATED NOISE

[75] Inventors: Menachem Diamantstein, Tel Aviv; Yona Newman, Ra-Anana; Victor Koren, Rishon-Le-Zion, all of Israel

[73] Assignee: Motorola, Inc., Schaumburg, Ill.

[21] Appl. No.: 875,930

[22] Filed: Apr. 29, 1992

[30] Foreign Application Priority Data

Apr. 30, 1991 [GB] United Kingdom ............... 9109301

[51] Int. Cl.⁶ .............................................. G06F 9/22
[52] U.S. Cl. .................................... 395/775; 395/575; 395/700; 364/221.1; 364/221.9; 364/230.3; 364/DIG. 7
[58] Field of Search ............... 342/195, 198, 202, 203; 395/375, 775, 800, 650, 575, 775, 700

[56] References Cited

U.S. PATENT DOCUMENTS 5,020,093 5/1991 Pireh ...................................... 379/59

OTHER PUBLICATIONS

Motorola, *DSP5600 Digital Signal Processor User's Manual*, ©1986 pp. 3-1 to 3-17.

Primary Examiner—Thomas C. Lee
Assistant Examiner—Sang Hui Kim
Attorney, Agent, or Firm—Daniel K. Nichols; Andrew S. Fuller

[57] ABSTRACT

This invention relates to electronic equipment comprising microprocessors, and more specifically microprocessors employed within radio receiver circuits, incorporating on-chip memory (301, 302, 303) and which have the ability to operate in either a single chip or expanded mode. The single chip mode restricts microprocessor (300) operation to internal operation and thereby inhibits external addressing and locally generated noise whereas the expanded mode allows external addressing. A software program, comprised from modules of program code, is categorised into a first and a second category of routines. First category routines are related to equipment functions which are affected by generated noise to a higher degree and, when in operation, are stored in the internal memory (301, 302, 303). Second category routines are stored in a memory external to the microprocessor (201, 202) and are related to equipment functions which are affected by generated noise to a lesser degree. The first and second category routines are executed in the microprocessor's single chip and expanded modes respectively.

33 Claims, 4 Drawing Sheets

FIG.1 —PRIOR ART—

SYSTEM FOR STORING DIFFERENT CATEGORIES OF ROUTINES IN INTERNAL AND EXTERNAL MEMORIES RESPECTIVELY AND EXECUTING THE ROUTINES BASED UPON IMPACT BY GENERATED NOISE

BACKGROUND OF THE INVENTION

This invention relates, in general, to electronic equipment comprising microprocessors which incorporate an internal cache of (i) Random Access Memory (RAM) and (ii) Read Only Memory (ROM) and which have a capability of dual mode operation. This invention is particularly, but not exclusively, applicable to dual mode microprocessors associated with radio receiver circuits.

SUMMARY OF THE PRIOR ART

Microprocessors are widely used in modern radio communications equipment. These microprocessors often form the basis for the control logic and communications circuitry within the radio and, in addition, of any other associated hardware.

FIG. 1, illustrates a functional block diagram of a prior art radio. In this illustration, a receiver section 110 and a transmitter section 112 are shown as separate blocks. However, radios which operate in a simplex mode, wherein receive and transmit functions do not operate simultaneously, often share components which are common to both circuits. This has a two-fold benefit: first, there is a reduction in the total number of components contained on the circuit board, and second, there is a corresponding reduction in the manufacturing cost.

An external power source 111, such as a 12V battery in the case of a mobile radio transceiver, is coupled to a stabilised power supply 119. Outputs from this supply 120 are responsive to the receiver 110, the transmitter 112 and a processor 116. The outputs 120 of power supply 119 are d.c. (direct current) supplies, typically, +12V for RF (radio frequency) power circuits, +10V for analog circuits and +5V for logic circuits. A first bidirectional signals bus 118 and a first bidirectional control bus 121, both comprising a plurality of conductors, couple the receiver 110 and the processor 116 together. Furthermore, the processor 116 is coupled to the transmitter 112 by a second signals bus 123 and a second controls bus 124. The second signals bus and the second controls bus both comprise a plurality of conductors. A third bidirectional bus 122 couples the processor 116 to a user interface 117. A loudspeaker 114 is coupled to a further output of the receiver 110. A microphone 115 is coupled to an additional input of the transmitter 112. Furthermore, the receiver 110 and the transmitter 112 are coupled to an antenna 113.

The operational function of the receiver 110 can be summarised by the simplified steps of receiving a modulated RF (radio frequency) signal from the antenna 113, demodulating this received signal and finally relaying the information as an audio signal to the loud speaker 114. Similarly, the operation of the transmitter 112 can be summarised by the steps of receiving an audio signal from the microphone 115, translating this information into a final modulated RF signal and then transmitting the modulated signal through the connected antenna 113.

By referring to FIG. 2, the processor can be seen to be comprised from a microprocessor 200, associated external ROM 201 and RAM 202 and interface circuitry 203, 204, 205. The processor also services the user interface 117. Typically, the user interface 117 comprises user input apparatus/circuitry, such as push buttons, selector switches and potentiometers, and user output displays, such as LCD's or LED indicators.

A signals bus 207, which combines the first 118 and second 123 signals buses of FIG. 1, is coupled through an interface 205 to the microprocessor 200. A controls bus 208, which combines the first 121 and second 124 controls buses of FIG. 1, is coupled directly to the microprocessor 200, as is the third bidirectional bus 122. User interface 117 is responsive to the other end of the third bidirectional bus 122. An external crystal 206 provides a predetermined operating clock frequency for the microprocessor 200 and is coupled thereto. External ROM 201 and RAM 202 are coupled to the microprocessor 200 via an address bus 203 and a data bus 204.

Microprocessor 200 is responsible for, among other things, the organisation of data flow between the various circuits in response to specific instructions, and for the timing of such data transfers. In addition, the microprocessor 200 has to output analog or digital signals to the receiver 110, the transmitter 112 and the user interface 117. The microprocessor 200 reads software programs stored in the ROM 201 and, occasionally, software programs stored in the RAM 202. Furthermore, the microprocessor 200 reads and writes information to data memory within the RAM 202. The software programs are constructed from modules of code, with each module related to specific operational functions of the radio. The modules of code which are operational at any one time are determined by the current states of the analog and digital signals from the receiver 110 and the transmitter 112, the current state of the radio (receiving or transmitting mode) and the user instructions obtained from the user interface 117.

The rate of reading and writing information on the address bus 203 and the data bus 204 within the processor 116 is determined by the microprocessor's internal clock rate. The clock rate is derived from the external crystal 206. In a typical microprocessor, such as the Motorola MC68HC11, the crystal's frequency is 8 MHz. This clock frequency equates to a corresponding read/write rate of 2 MHz. However, microprocessor read/write operations on external busses causes the generation of a spectrum of noise spikes at the bus accessing frequency and at the $n^{th}$ harmonics thereof. In the case of the MC68HC11, these noise spike occurs at 2 MHz and at integer intervals of 2 MHz. Additionally, if a microprocessor is running a (simple) program module which is, for example, accessed once every millisecond, then the 2 MHz spectral noise components are widened by the frequency of the access rate i.e. $\pm 1$ kHz in the above example.

Modern radio equipment, operating at frequencies of 70~100 MHz, often utilises fast software interrupt routines to generate and decode signalling data. This signalling data could be, for example, Motorola's proprietary Slat-Alert Digital Signalling Scheme or other standard signalling schemes such as the Select 5 tone signalling method (which is used widely across Europe and America) or the ZVEI Binary digital signalling method employed in Germany. At these frequencies, the generated noise components can possess significant energies which affect the operational performance of the radio.

The generated noise is transferred to the radio's sensitive receiver circuits 110 by capacitive and inductive pick-up from the address and data buses, direct radiation and by direct coupling through the signal and control busses. Another avenue which avails itself to the generated noise transfer process is the common power supply connection 120 (of FIG. 1) between circuit components.

With the radio operating in the receive mode, radio frequency (RF) signal strengths can be, for example, as low as 0.3 $\mu V$. However, the generated noise pick-up is often an order of magnitude greater than this value ($\sim$3–5 $\mu V$). The generated noise can therefore cause a significant and unacceptable reduction in the sensitivity of the radio and must be, in some way, eliminated, prevented or restricted. Furthermore, a second source of noise which requires consideration emanates from microprocessor driven equipment directly associated with the operation of the radio. This equipment, for example, could be a signalling unit for adding on signalling functions to a non-signalling radio. In such a case, the associated equipment would be coupled to some, if not all, of the radio's connections e.g. the external power source 111, the signals bus 118 and the control bus 121, etc. This associated microprocessor driven equipment therefore contributes to the overall generation of noise within the system by the same mechanisms as described above.

Conventional methods employed within the art for preventing generated noise from interfering with the radio receiver's sensitivity normally consist of enclosing the entire processor block 116 within a screened box. This screened box is often coated with a conductive paint finish to enhance RF shielding. In addition, all input and output connections to the processor 116 are filtered by a variety of techniques such as inductive chokes or resistors and parallel capacitors (feed-through capacitors) coupled to ground. Furthermore, the decoupling of the power supply to the processor board is practiced. Disadvantages which arise from these prior art solutions manifest themselves in a number of ways; namely that there is a considerable increase in the cost, complexity, weight and size of the radio and, in the case of power supply line decoupling, high current requirements of the radio in the transmit mode make the solution impractical.

Clearly, it can be appreciated that there is a significant requirement within the art to provide a radio, and more specifically a microprocessor, which minimises the generation of noise and consequently improves the sensitivity of the radio receiver. In addition, it would be desirable that the improvement in the sensitivity and noise immunity were accompanied by a reduction in the overall cost, weight and size of the radio, and a reduction in the complexity of implementation.

SUMMARY OF THE INVENTION

This invention addresses at least some of the disadvantages set out in the prior art described above. In accordance with the present invention, there is provided electronic equipment, for example a radio receiver, which comprises a microprocessor. The microprocessor incorporates an internal on-chip memory and has the ability to operate in either a single chip mode or an expanded mode. The single chip mode restricts microprocessor operation to internal operation and thereby inhibits external addressing and locally generated noise, whereas the expanded mode allows external addressing. A software program, comprised from modules of program code, is categorised into a first and a second category of routines. The first category of routines are stored in the internal memory and are related to equipment functions which are affected by generated noise to a higher degree (e.g. receive functions). The second category of routines are stored in the memory external to the microprocessor and are related to equipment functions which are affected by generated noise to a lesser degree (e.g. transmit functions). Furthermore, means are provided for executing the first category routines in the microprocessor's noise-limiting single chip mode and executing the second category routines in the microprocessor's expanded mode.

In a preferred embodiment of the invention, the first category of routines are, additionally, sub-divided into primary and secondary algorithms. Primary first category algorithms comprise program code which is active continually. Secondary first category algorithms comprise code which is called upon from time to time but, when active, has a heavy bus usage. (This sub-division becomes necessary when the total code size of the first category routines exceeds the internal memory capacity of the microprocessor). The primary first category algorithms are permanently stored within the internal memory of the microprocessor while the secondary first category algorithms are, initially, stored in the external memory. The sub-division allows the use of an internal volatile memory. The secondary first category algorithms are only transferred to the on-chip memory of the microprocessor when required. Once loaded within the internal memory, the secondary algorithms are executed after the microprocessor has returned to the noise-limiting single chip mode.

The microprocessor switches between the single chip mode and the expanded mode upon the reception of specific instructions. These instructions are either software or hardware generated and cause a mode change through the activation of a mode switch. Program control is maintained during a mode change by the use of an address or jump vector which is retained within either the internal memory of the microprocessor or in a storage means, such as a data latch.

Electronic equipment so designed and described would therefore produce the novel advantages of a reduction in the amount of microprocessor generated noise and, in the application of the invention within radio receiver circuits, a corresponding improvement of the sensitivity therein. Furthermore, since the advantages obtained through the implementation of the invention are not based upon prior art techniques, additional advantages arise as a result of an associated reduction in the weight and size of the electronic equipment and a reduction in the overall complexity of implementation.

An exemplary embodiment of the invention will now be described with reference to the accompanying drawings.

DETAILED DESCRIPTION OF THE PREFERRED EMBODIMENT

Figure 1:
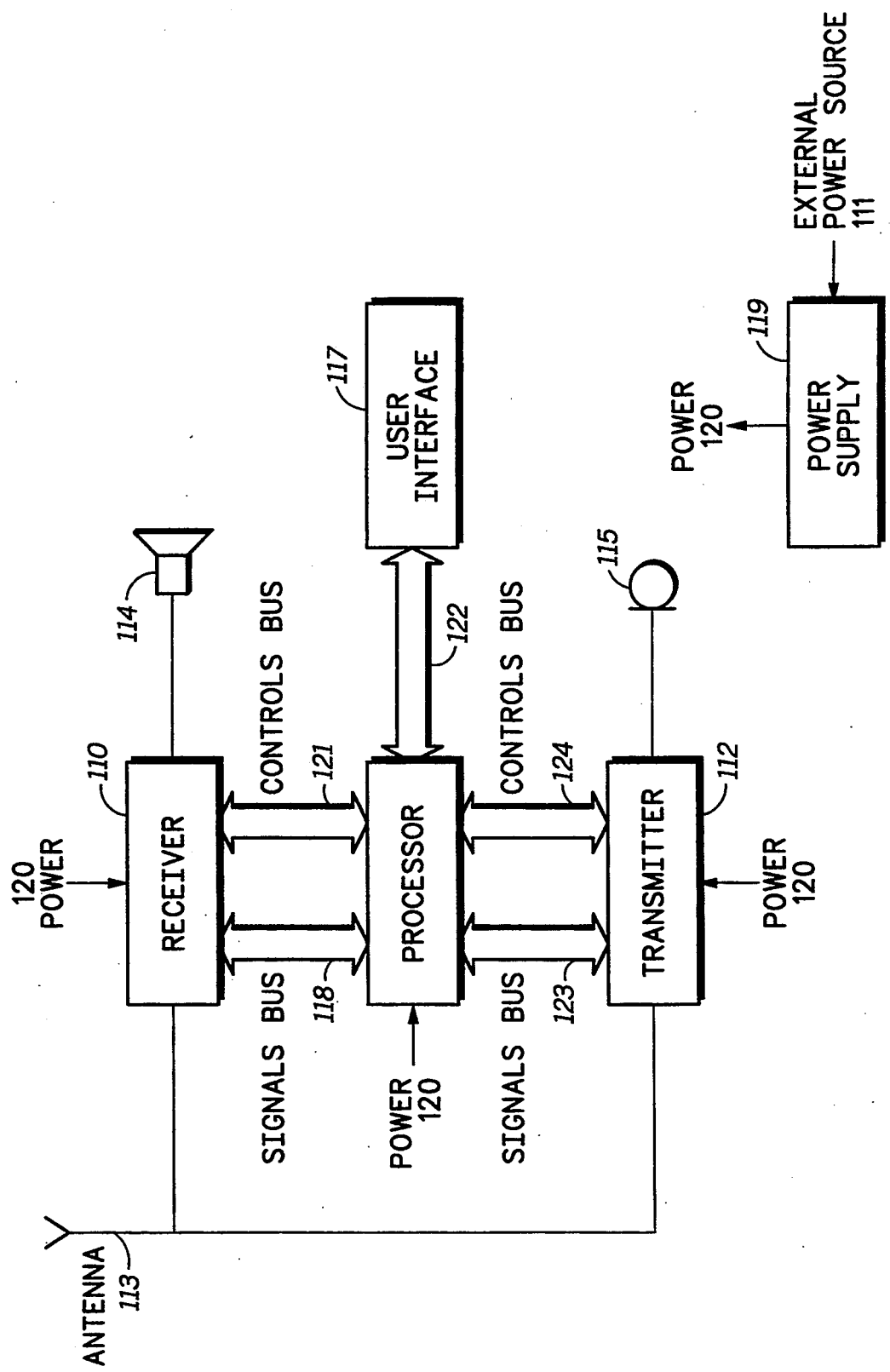
FIG. 1 illustrates a block diagram of a typical radio in accordance with the prior art.
Figure 3:
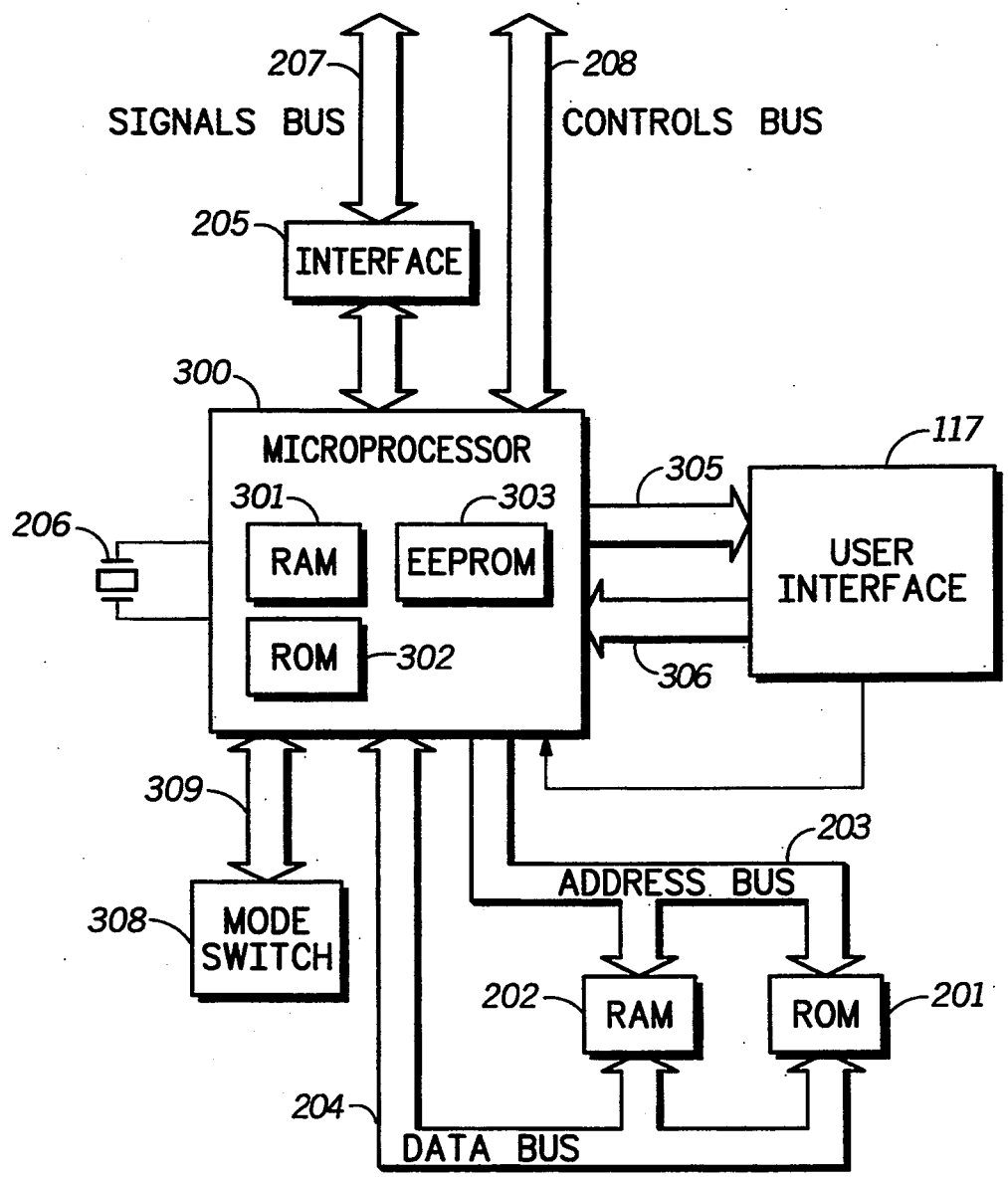
FIG. 3 illustrates a preferred embodiment of a dual mode microprocessor, with associated hardware, in accordance with of the present invention and suitable for implementation within electronic equipment, such as the prior art radio of FIG. 1.

In accordance with the preferred embodiment of the invention, FIG. 3 illustrates a dual mode microprocessor 300 incorporated within a processor 116 of a prior art radio transceiver (FIG. 1). The dual mode microprocessor 300 comprises an internal cache of RAM 301 and ROM 302. The ROM 302 may be in the form of masked ROM or EPROM (Electrically Programmable ROM). In addition, the dual mode microprocessor may also contain EEPROM 303 (Electrically Erasable Programmable ROM) which can be used for either permanent program or data memory storage.

Figure 2:
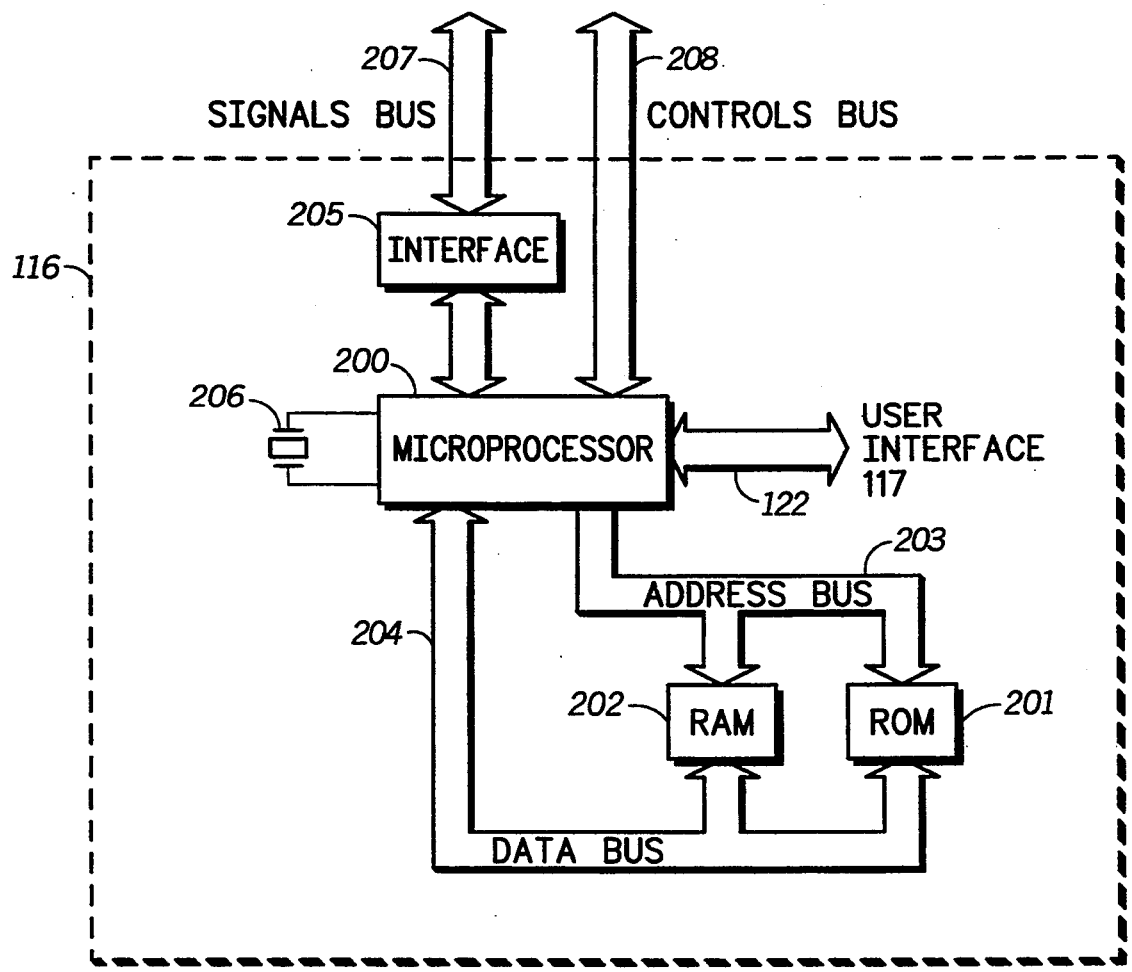
FIG. 2 illustrates the architecture of a processor of the prior art radio of FIG. 1.

The preferred embodiment of the invention, FIG. 3, is substantially based upon the prior art processor of FIG. 2. Addition features which prevail within the preferred embodiment are:

(i) a mode switch 308 is coupled, through a plurality of conductors 309, to a first and second mode select terminal of the dual mode microprocessor 300;

(ii) user interface 117 provides an additional coupled input to the dual mode microprocessor 300 via a control input conductor 307. This conductor provides a means for initiating a mode change within the dual mode microprocessor; and (iii) user interface 117 is coupled to the dual mode microprocessor 300 by a plurality of data inputs 305 and a plurality of data outputs 306. These inputs and outputs replace the third bidirectional coupling bus 122 of the prior art processor 116.

Experimentation has shown that the amount of generated noise within the processor can be substantially reduced if the microprocessor only operates in an internal mode, wherein the internal memory caches 301, 302, 303 are utilised. Consequentially, the dual mode microprocessor 300 functions in either a single chip mode or a expanded mode. The basic (normal) mode of operation occurs in the single chip mode wherein noise interference, which affects sensitive (radio receiver) functions and which is generated by external associated equipment and external bus accessing activity, is minimised. While the microprocessor 300 is operating in this single chip mode, the external ROM 201 and RAM 202 are inoperative. Additionally, the external address bus 203 and data bus 204 are not energised. By rendering these external components and connections inactive, and by optimising the amount of time that the dual mode microprocessor 300 spends in internal operations, the amount of generated noise is substantially reduced.

The desired reduction in the generated noise level within the sensitive (radio receive) functions of the radio is achieved and implemented through the partitioning of the program code within the dual mode microprocessor 300. Systematic analysis of the program code is used to relate each module of code to distinct operational functions of the radio. Since specific modules can be assigned to certain operational functions, two categories of code can therefore be derived. A first category of routines are involved with processor (radio) functions which are particularly susceptible to the affects of noise e.g. radio receiver functions. These first category routines are run inside the dual mode microprocessor 300 when the single chip mode is operative. Second category routines are involved with processor (radio) functions in which generated noise does not have such a dramatic effect on processor (radio) performance e.g. radio transmitting functions and functions which (a) change the mode of the equipment or (b) communicate with the user. These second category routines utilise the external memory 201, 202 and the external busses 118, 121, 203, 204 and are operative within the expanded mode.

Ideally, all routines which fall within the first category should be stored in the internal ROM (EPROM) 302 and, where available, the internal EEPROM 303 of the dual mode microprocessor 300. In addition, EEPROM 303 may also contain data constants which only change sporadically. Unfortunately, present technology restricts internal microprocessor memory sizes. An internal masked ROM is typically ~8K, whereas internal EEPROM, specifically in the case of Motorola's MC68HC11, has a memory size of up to 2K. On the occasion when the code size (in bytes) of the first category routines exceeds the the combined internal memory size of the ROM 302 and EEPROM 303, the internal RAM 301 of the dual mode microprocessor 300 can be used to periodically store modules of first category routine code in addition to data and variables generated by the program. Internal RAM 301 is typically ~0.5K.

In order to utilise the additional memory capacity provided by the internal RAM 301 more efficiently, the first category routines may be further sub-divided into primary and secondary algorithms. The primary algorithms of the first category routines comprise program code which is active continually. Secondary algorithms comprise code which is called upon from time to time but, when active, has a heavy bus usage e.g. delay loops or loops which monitor for a change in state of an input, etc. The software is now arranged so that primary first category algorithms 312 are stored permanently within the internal ROM (EPROM) 302 of the dual mode microprocessor 300, while secondary first category algorithms 311 are initially stored in the external memory 201, 202. These secondary algorithms are transferred to the internal RAM 301 on a per call basis i.e. only when each specific routine is required. Once loaded within the internal RAM 301, the secondary algorithms are run when the dual mode microprocessor has returned it's noise limiting single chip mode.

The microprocessor 300 switches between the single chip mode and the expanded mode upon the reception of specific instructions. These instructions are obtained as a result of any one of four kinds of event: (a) a program module operation; (b) a specified change in one of the signal 118 or control bus 121 lines; (c) a change in one of the user interface data output lines 305 initiated by a user; and, finally, (d) a change in the control input conductor 307, also initiated by the user. The mode change is performed through the activation of mode switch 308.

A mode change which occurs as a result of the first kind of event (a), i.e. a program module operation, arises at numerous times. For example, when the dual mode microprocessor is in a radio receive mode, a decoded, received data signal may require an acknowledgment in the form of a transmitted data message. As has been previously outlined, the microprocessor generated noise is not significant in relation to any transmitted signal level. Therefore, any transmitted data acknowledgement can be processed and generated from program codes (modules) located in external ROM 201 and external RAM 202 i.e. within the expanded mode.

Similarly, a decoded, received data signal may instruct the dual mode microprocessor 300 to display the received information to the user. Another example of this type of initiated mode change occurs when, for example, analysis of the characteristics of the low level received signal is performed by external communications equipment. In such a case, the analysed data is output through the user interface 117 to a peripheral user display. Provided that the specified analysis has been completed, the expanded mode is initiated and program modules of code located in external ROM 201 will be accessed in order to generate a desired user display output.

The second kind of event resulting in a mode change (b), relates to a specific change in one of the signal 118 or control bus 121 lines, is primarily concerned with set up procedures for the radio. For example, a radio receiver may contain hardware for identifying and detecting a received signal. This hardware could be based on, for example, the detection of the modulating carrier wave of the received signal. Upon the detection of an incoming signal, the receiver provides a control line change to the dual mode microprocessor 300. The dual mode microprocessor then alerts the user that an incoming call has been received. This could typically be performed by either illuminating a "CALL" indicator or by generating a tone through the radio's audio speaker 114 or both. The expanded mode can once again be utilised wherein program code stored within the external ROM 201 is accessed.

Mode changes initiated through the third and fourth kinds of event (c) and (d), i.e. changes in the user interface data outputs 306 and 307, occur as a result of a user input instruction. For example, the user may actuate a key, such as a push to talk (PTT) key, which requires the radio transmitter to be enabled. Alternatively, the user may select a change channel key such as a Mode Select or Scan key (not shown), whereupon the radio's operating mode is changed to the expanded mode. These user key inputs may be coupled directly to the dual mode microprocessor 300 through one of the data outputs 306 or via the control input conductor 307. An input to the microprocessor via the control conductor 307 would, typically, require the microprocessor to ascertain which user key had been activated.

Before a mode change can be initiated, an address or jump vector is written into the internal RAM of the dual mode microprocessor. This address or jump vector retains program control during the mode change. The address or vector points to a specific start location of a desired routine which is to be initiated after the micro-reset has been forced. This address or vector is stored within the internal RAM because the contents of this memory are conserved during the micro-reset. Furthermore, each type of reset used by the dual mode microprocessor e.g. clock monitor fail, illegal op-code, watchdog timer time out or an electrical reset, has a unique reset address or vector. Upon reaching this reset address or vector, a simple routine executes a JUMP command to a program segment specified by the stored RAM address or vector. Since a micro-reset clears certain microprocessor registers and ports, the first procedure initiated by the program segment after a mode change has occurred is the re-initialisation of these registers and ports.

If a dual mode microprocessor does not maintain its internal RAM state during a forced micro-reset, an external serial or parallel data latch (not shown) can be loaded with a bit value which represents a specific start location. This external latch can be read after the mode change to order to obtain the desired jump vector. For example, an 8-bit serial latch can be loaded with $2^8$ possible states. Each state therefore maps to one of $2^8$ different program segments. It should be appreciated by one skilled in the art that other forms of storage devices, which retain data, can also be used e.g. a parallel data latch or a first-in-first-out (fifo) memory.

All dual mode microprocessors 300 have one or more mode inputs which define their operating mode. With specific reference to Motorola's MC68HC11 dual mode microprocessor, the logic states of two input pins (MODEA and MODEB) determine the operating mode. The expanded mode is obtained by switching the MODEA input from a low logic value to a high logic value. MODEB is permanently tied through a resistor to a value of +5V. Typically, these inputs are read by the dual mode microprocessor 300 after a reset signal has been received. In the preferred embodiment of the invention, the operating mode is changed by, first, configuring the mode input(s) for the new, specified operating mode and, second, by forcing a microprocessor reset.

There are two alternative techniques by which a microprocessor micro-reset can be performed. These are: a software initiated reset and a hardware initiated reset.

Modern dual mode microprocessors 300 normally contain an internal hardware circuit which verifies the presence and operation of the microprocessor's internal clock. In the absence of the internal clock signal, this internal hardware circuit forces a micro-reset. Therefore, this clock monitor fail provides a first method of changing modes. In the case of the Motorola MC68HC11 microprocessor, each time the program code initiates a micro-reset through a clock monitor fail mechanism, the clock monitor enable (CME) bit in the CONFIG register is enabled and the stop disable (S) bit in the CCR register is cleared. The mode change then occurs when a STOP instruction is issued from the software. The clock monitor reset is guaranteed and is automatically forced after a delay of between 5 and 100 microseconds ($\mu$s). This delay time is set by an internal RC circuit contained within the microprocessor.

In addition to the internal clock monitor fail circuit, modern dual mode microprocessors also contain an internal hardware watchdog timer circuit. This circuit must be periodically reset by the program within a predefined time interval. In the event that no watchdog timer circuit reset occurs within the prescribed period, a micro-reset is forced. Again by considering the Motorola MC68HC11 microprocessor as an example, the internal watchdog timer circuit (termed the computer operating properly or COP timer) is enabled by a NOCOP bit in the CONFIG register. If the COP timer control bits (CR0 and CR1) in the internal OPTION register are both zero, a time period of 16.384 ms is obtained for an external crystal oscillator clock frequency 206 of 8 MHz. In order to reset the COP timer within the microprocessor, the program code must write contiguous hexadecimal instructions $55 and $AA to the COPRST register within a time interval smaller than the COP timer period. These reset instructions are implemented by either a program segment within a major software program loop/execution or by an interrupt routine which is independent of the main program loop. Typically, the reset instruction is activated every 10 ms of the MC68HC11's internal software timers. It can therefore be appreciated that a mode change can also be initiated, when required, by stopping the reset of the COP timer i.e. by producing a watchdog timer time-out. The COP reset and hence a micro-reset will automatically be forced within a period of 16.384 ms. The exact time period before reset is determined by the defined COP time-out and by the length of time that has elapsed since the previous COP timer reset.

A third method of forcing a software initiated micro-reset is through the use of an illegal Op-code detect circuit. In addition to internal hardware circuits for clock monitor fails and watchdog timer time-outs, modern dual mode microprocessors often contain internal hardware circuits which specifically check the software program code for undefined or illegal op-code instructions. A micro-reset is forced if, for example, the microprocessor receives a program data value instead of an expected instruction op-code. Therefore, a mode change can be instigated, when required, by the issuance of a BRANCH or JUMP instruction, from the software, to a code address containing a computational constant. This location must contain a constant which does not signify a legal op-code for the dual mode microprocessor. Any discovered illegal op-code will, consequentially, cause an immediate forced micro-reset.

Figure 4:
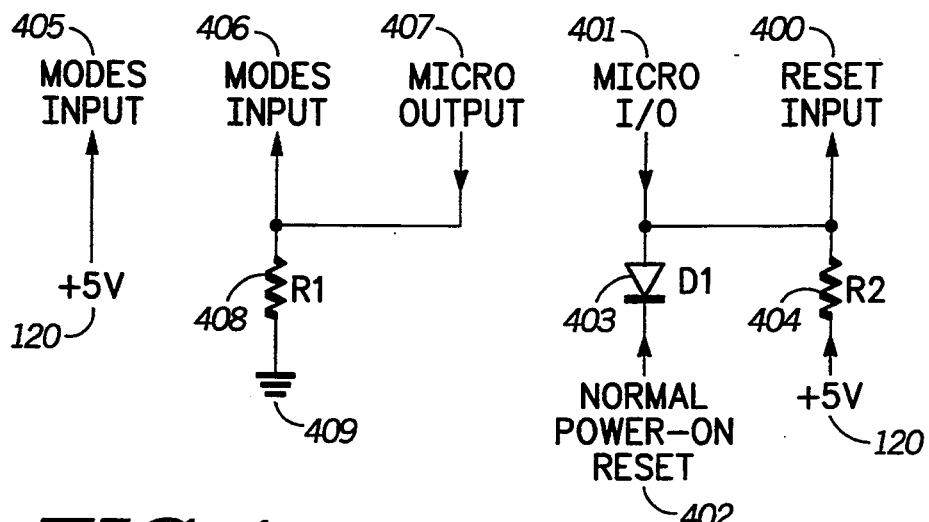
FIGS. 4a–4c illustrate methods of implementing a mode switch within the dual mode microprocessor of FIG. 3.
Figure 5:
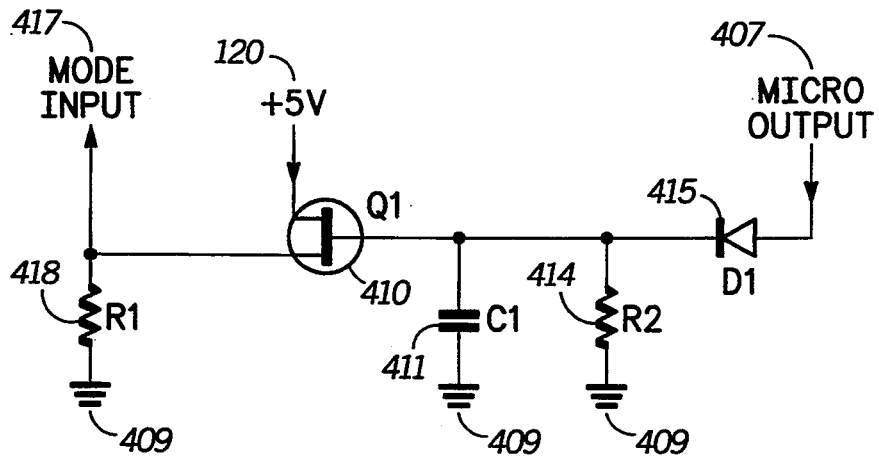
Figure 6:
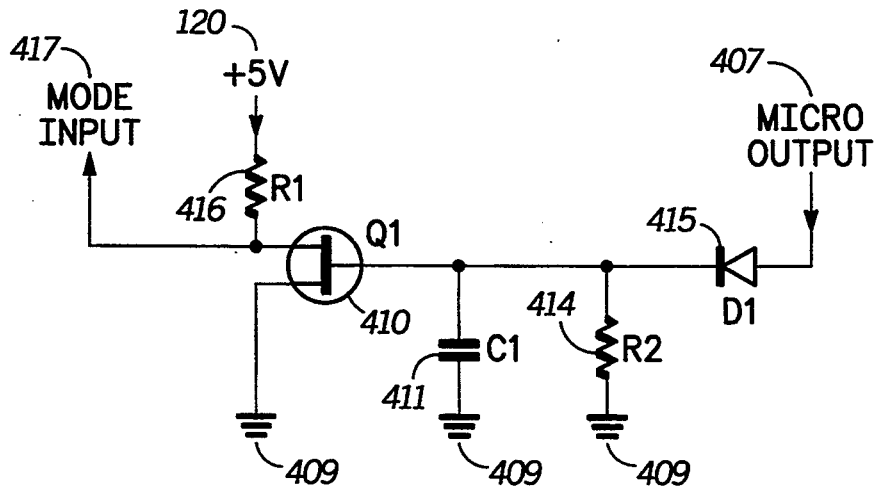

A hardware method for forcing a micro-reset in a dual mode microprocessor with an active low input pin e.g. the Motorola MC68HC11, is illustrated in FIG. 4a. An active low reset input 400 and a bidirectional input-/output pin 401 of the dual mode microprocessor 300 are coupled together. A power-up reset signal 402 is coupled through the negative terminal of a diode 403 to the bidirectional input/output pin 401. This reset signal 402 is provided by modern microprocessor equipment so as to maintain a reset mode within the processor immediately after power-up has occurred. This power-up reset mode remains active until the +5V power supply to the logic reaches a preset minimum value, typically +4.75V, at which point the processor is guaranteed to function correctly. Furthermore, the reset pin 400 is coupled through a pull-up resistor 404 to the +5V power supply voltage 120. At the end of the power-up reset period, bidirectional input/output pin 401 operates as an input and the power-up reset input 402 is high (+5V). The voltage drop across resistor 404 ties the reset pin 400 to the +5V supply and ensures that the reset signal 402 is removed from the microprocessor. Operation of the microprocessor then commences.

On initial power-up, the power-up reset input 402 goes low (OV). Bidirectional input/output pin 401 operates as an input and, as a result of the action of diode 403, the reset input pin 400 is pulled low. In Motorola's MC68HC11, mode input pin MODEB 405 is tied through a resistor (not shown) to the +5V supply 120. The MODEA input 406 is coupled to a microprocessor output 407 and, additionally, to ground (OV) potential 409 through pull-down resistor 408. Microprocessor output 407 is any general purpose output pin provided by the microprocessor. Therefore, since the output pin 407 is low after a micro-reset has been forced, MODEA input 406 is also low and the single-chip mode is obtained upon power-up.

A mode change can be initiated, when required, by first setting the micro output 407 to the designated logic state which determines the operating mode and then, second, changing the bidirectional input/output pin 401 to an output with a low logic level. A hardware initiated micro-reset now occurs. It should be apparent that, in the case of the Motorola MC68HC11, the logic state of the MODEA pin on micro-reset determines the operating mode of the dual mode microprocessor. In addition, the bidirectional input/output pin 401 only remains as an output until the dual mode microprocessor has started its reset routine. By automatically resuming its input function, the input/output pin 401 ensures that the microprocessor only remains in a reset state for the minimal length of time.

It should be appreciated by one skilled in the art that in order to reverse the operating polarity of the dual mode microprocessor reset, resistor 404 would be coupled to ground potential (thereby acting as a pull-down resistor) and diode 403 would be orientated with a reversed polarity.

FIG. 4a, illustrates the preferred embodiment of the hardware mode switch (308 of FIG. 3) for a dual mode microprocessor 300, such as Motorola's MC68HC11, which requires only one mode input change to facilitate a mode switch. If a dual mode microprocessor requires a mode input pin to be set at a high logic level upon power-up and then changed to a low logic level during operation, the mode input pin should be coupled to a bidirectional input/output pin in an identical manner to that described for the power-up reset pin. In addition, resistor 408 should act as a pull-up resistor and should therefore be coupled to the +5V supply 120. In the case of dual mode microprocessors which require more than one of their respective mode input pins to be changed, each mode input pin must be coupled to an output pin. This output pin can be any one of the general purpose output pins provided by the microprocessor. Furthermore, dual mode microprocessors often read their mode input pins immediately on a micro-reset instruction and before the initialization of microprocessor output pins occurs. Therefore, the output states for the required new mode are set before the forced micro-reset.

A significant proportion of modern dual mode microprocessors, such as the MC68HC11, do not require their mode input or reset input pins to maintain logic states after these pins have been read by the microprocessor i.e. the microprocessor has a zero hold time. In the event that a finite hold time is required, FIGS. 4b and 4c illustrate hardware configurations capable of producing finite hold times.

FIG. 4b illustrates a finite hold time circuit specifically supplying low input conditions to a microprocessor mode select input pin 417 on initial power-up. Micro output 407 is coupled through diode 415 to the gate terminal of a p-channel JFET 410. A 5V voltage supply 120 is coupled to the source terminal of the JFET 410 and a drain terminal is coupled to the mode input 417. A resistor 418 is coupled between the mode input 417 and ground 409. A parallel combination of a capacitor 411 and a resistor 414 are coupled between ground 409 and the gate of the JFET and the negative terminal of the diode 415. Resistor 418 holds mode input 417 at a low logic level. On power-up, the microprocessor output pin 407 is low. As a consequence, the JFET will be non-conducting and the input state of the mode input determined by resistor 418. When a change of mode is required, the micro output pin 407 is set high. This causes the JFET to become conducting and therefore sets the mode input pin 417 to a high logic state. After a micro-reset has been forced, the micro output pin 407 returns to a low logic level without affecting the the operation of the JFET 410. The JFET remains on because diode 415 prevents capacitor 411 from discharging. The time constant produced by the product of the capacitance of capacitor 411 and the resistance of resistor 414 therefore determines the time duration for which the mode input pin 417 remains at a high logic level.

FIG. 4c, illustrates a finite hold time circuit specifically supplying high input conditions to a microprocessor mode select input pin 417 on initial power-up. The time duration that the mode input pin remains high is again determined by the time constant generated by the previously described parallel, open circuited RC configuration. Micro output 407 is coupled through diode 415 to the gate terminal of p-channel JFET 410. However, mode input 417 is coupled to the source terminal of JFET 410. Furthermore, mode input 417 is coupled to the +5V voltage supply 120 through resistor 416. The drain terminal of JFET 410 is coupled to ground (OV) potential 409. On power-up, resistor 416 holds mode input 417 at a high logic level.

It should be apparent to one skilled in the art that dual mode microprocessors which require a finite hold time on their reset input pins can be implemented through either the same delay technology as described above or through other alternative configurations.

Dual mode microprocessor control bus lines (121 of FIG. 3) which control the radio components, such as the transmitter and receiver, must retain their logic states during a mode change. Normally, all output lines from a dual mode microprocessor are set to a low logic level after a micro-reset has occurred. However, when the dual mode microprocessor is operating in the single chip mode, certain input lines are required to operate at high logic levels e.g. the PTT input on a conventional radio is normally at a high logic level when in a radio receive mode. These high input states in the single chip mode can be obtained through the use of either parallel or serial data latches or pull-up resistors in conjunction with bidirectional input/output lines. A supplementary advantage derived from the use of bidirectional input/output lines is that these lines can be defined as additional outputs in the expanded mode. After a micro-reset has been forced, any line which has been defined as an output automatically reverts back to an input, with its logic state determined by the associated pull-up or pull-down resistor.

The preferred embodiment of the invention is particularly, but not exclusively, applicable to an application within radio equipment. Furthermore, an application for the invention can be found within "add-on" equipment which is external to the radio but which has a tendency to generate RF noise. However, it should be obvious to one skilled in the art that the invention could as equally well be applied to any multi-mode electronic apparatus wherein a first mode is sensitive to micro-processor generated noise e.g. spectrum analysers and communications test equipment.

It can therefore be appreciated that an invention so designed and described would produce the novel advantages of a reduction in the amount of microprocessor generated noise and, consequentially, an improvement in the sensitivity of (i) the microprocessor and, more importantly, (ii) any associated radio receiver. Furthermore, there is an additional reduction in the overall cost of a radio receiver which encompasses this invention. In addition, further benefits are derived from a reduction in weight and size of a radio and a reduction in the complexity of implementation.

It will, of course, be understood that the above description has been given by way of example only, and that modifications of detail can be made within the scope of the invention.

We claim:

1. Electronic equipment comprising:
    a) a microprocessor, for the processing and output of data signals, having:
        i) internal memory
        ii) a central processing unit; and
        iii) internal buses coupled between said memory and said processing unit;
    b) memory external to said microprocessor; and
    c) external buses, for external addressing, coupled between said memory external to said microprocessor and said microprocessor;
    d) first portion susceptible to generated noise to a higher degree and second portion susceptible to generated noise to a lesser degree;
    wherein the microprocessor has the ability to operate in:
        i) a single chip mode in which the microprocessor restricts itself to internal operation between said internal memory, said processing unit and said internal buses and thereby inhibits addressing on the external buses and reduces locally generated noise; and
        ii) an expanded mode in which the microprocessor performs operations on the external bus;
    the equipment further comprising:
    e) a software program associated therewith, comprised from modules of program code, and categorized into:
        i) a first category of routines for execution by the microprocessor in single chip mode, stored in said internal memory, and related to first portion functions affected by generated noise to a higher degree; and
        ii) a second category of routines for execution by the microprocessor in expanded mode, stored in said memory external to the microprocessor, and related to second portion functions affected by generated noise to a lesser degree; and
    f) means for executing the first category routines in the microprocessor's single chip mode for controlling said first portion and executing the second category routines in the microprocessor's expanded mode for controlling said second portion.

2. Electronic equipment in accordance with claim 1, wherein the first category of routines are further subdivided into:
    a) a set of primary first category algorithms comprising modules of first category code which are continually operational and which are permanently stored within the internal memory of said microprocessor; and
    b) a set of secondary first category algorithms comprising modules of first category code which are only executed from time to time and which are initially stored in the memory external to said microprocessor;
    wherein the electronic equipment further comprises means for loading the secondary first category routines into the internal memory of the microprocessor when called upon to implement such.

3. Electronic equipment according to claim 2, further comprising:

input means for receiving a command to change between said single chip and said expanded mode; and means for implementing a mode change in response to said received command;

whereby the command to change between said modes forces a micro-reset of the microprocessor.

4. Electronic equipment according to claim 3, wherein the means for implementing the change between modes comprises storage means receptive to a bit value, generated by the microprocessor, which represents a vector signifying a desired start location within the software program for the new operating mode, such that the bit value is written to the storage means prior to the forced micro-reset and is read from the storage means immediately after the mode change has occurred.

5. Electronic equipment according to claim 4, wherein means are provided for writing the vector, representing a desired start location for the new operating mode, to the internal memory of the microprocessor prior to the initialization of the forced micro-reset and then immediately reading the vector after the change of mode has occurred.

6. Electronic equipment according to claim 5, wherein the command to change between said modes is generated in response to the registration of a clock monitor fail within the microprocessor and the issuance of a STOP instruction by a module of code.

7. Electronic equipment according to claim 5, wherein the command to change between said modes is generated in response to the enablement of a watchdog timer circuit and the prevention of a software reset of the watchdog timer.

8. Electronic equipment according to claim 5, wherein the command to change between said modes is generated in response to the detection of an illegal op-code at a specific, designated location within a module of code.

9. Electronic equipment according to claim 5, wherein the command to change between said modes is generated in response to the initialization of a mode select means and the activation of a coupled microprocessor reset input means.

10. Electronic equipment according to claims 4, wherein the vector is uniquely defined by the command received from each specific input means.

11. Electronic equipment according to claim 10, wherein the vector contains a routine which accesses a first module of code which re-initiates the microprocessor and then initiates a desired second module of code.

12. Electronic equipment in accordance with claim 1, wherein the internal memory comprises both volatile and non-volatile memory.

13. Electronic equipment according to claim 1, wherein the microprocessor forms part of radio communications apparatus comprising:

a receiver;

a transmitter; and a user interface.

14. A method for reducing the effect of locally generated noise in electronic equipment having first portion susceptible to generated noise to a high degree, second portion susceptible to generated noise to a lesser, a microprocessor, memory external to said microprocessor, and external buses, for external addressing, coupled between said memory external to said microprocessor and said microprocessor, said microprocessor having internal memory, a central processing unit and internal buses coupled between said memory and said processing unit; the method comprising the steps of:

a) providing modules of program code;

b) partitioning said modules of program code into:
   i) first category routines which, are related to first portion functions affected by generated noise to a higher degree; and
   ii) second category routines which, when in operation are related to second portion functions affected by generated noise to a lesser degree;

c) storing at least temporaneously the first category routines in memory internal to said microprocessor;

d) storing the second category routines in memory external to said microprocessor;

e) operating said microprocessor selectively in single chip mode in which the microprocessor restricts itself to internal operation between said internal memory, said processing unit and said internal buses and thereby inhibits addressing on the external buses and reduces locally generated noise; and in an expanded mode in which the microprocessor performs operation on the external bus;

f) executing said first category routines for controlling said first portion whilst said microprocessor is operating in said single chip mode; and g) executing said second category routines for controlling said second portion whilst said microprocessor is operating in said expanded mode;

whereby the detrimental affect of locally generated noise on equipment functions, susceptible to said noise to a higher degree, is reduced.

15. A method in accordance with claim 14, further comprising the steps of:

(f) sub-dividing the first category routines into:
   i) a set of primary first category algorithms comprising modules of first category code which are continually operational and which are permanently stored within the internal memory of said microprocessor; and
   ii) a set of secondary first category algorithms comprising modules of first category code which are only executed from time to time and which are initially stored in the memory external to said microprocessor; and g) having the microprocessor execute the primary first category algorithms in said single chip mode.

16. Equipment in accordance with claim 15, further comprising:

input means for receiving an instruction to change between said single chip and said expanded mode; and loading means for loading the secondary first category routines into the internal memory of the microprocessor in response to said received command;

the method further comprising the steps of:

h) receiving an instruction to change between said single chip and said expanded modes;

i) loading said secondary first category algorithms into said internal memory;

j) entering said single chip mode; and j) executing said secondary first category algorithms in said single chip mode.

17. A method in accordance with claim 16, wherein the step of changing between said single chip and said expanded modes is implemented through:

k) the forcing of a micro-reset of the microprocessor.

18. A method in accordance with claim 17, further comprising the steps of:

l) storing a bit value, which represents a vector signifying a desired start location within the software program and which is generated by the microprocessor, in said internal memory prior to the initialisation of said forced micro-reset;

m) reading stored bit value immediately after a change between said single chip and said expanded modes; and n) executing the code located thereat.

19. Electronic equipment comprising:

a) microprocessor which contains on-chip memory and internal buses and which has the ability to operate in a single chip mode and an expanded mode, wherein the single chip mode restricts microprocessor operation to internal operation and thereby inhibits external addressing and locally generated noise and the expanded mode allows external addressing;

b) first portion susceptible to generated noise to a high degree and second portion susceptible to generated noise to a lesser degree;

c) a memory external to the microprocessor and coupled thereto;

d) a software program, associated with said electronic equipment comprised from modules of program code which are categorized into:

i) a first category of routines for execution by the microprocessor in single chip mode, stored in said internal memory, and related to first portion functions affected by generated noise to a higher degree; and ii) a second category of routines for execution by the microprocessor in expanded mode, stored in memory external to the microprocessor, and related to said second portion functions affected by generated noise to a lesser degree; and e) means for executing the first category routines in the microprocessor's single chip mode for controlling said first portion and executing the second category routines in the microprocessor's expanded mode for controlling said second portion.

20. Electronic equipment in accordance with claim 19, wherein the first category of routines are further sub-divided into:

a) a set of primary first category algorithms comprising modules of first category code which are continually operational and which are permanently stored within the internal memory of said microprocessor; and b) a set of secondary first category algorithms comprising modules of first category code which are only executed from time to time and which are initially stored in the memory external to said microprocessor;

wherein the electronic equipment further comprises means for loading the secondary first category routines into the internal memory of the microprocessor when called upon to implement such.

21. Electronic equipment in accordance with claim 20, wherein the microprocessor forms part of a radio communications device which comprises:

a receiver;

a transmitter; and a user interface.

22. Electronic equipment in accordance with claim 20, wherein the internal memory comprises:

a) non-volatile memory in which said primary first category algorithms are stored; and b) volatile memory in which said secondary first category algorithms are periodically loaded and stored.

23. Electronic equipment according to claim 22, further comprising:

input means for receiving a command to change between operating modes; and means for implementing an operating mode change in response to the reception of a command from the input means;

whereby the command to change between said modes forces a micro-reset of the microprocessor.

24. Electronic equipment according to claim 23, wherein the means for implementing the change between modes comprises storage means receptive to a bit value, generated from the microprocessor, which represents a vector signifying a desired start location within the software program for the new operating mode, such that the bit value is written to the storage means prior to the forced micro-reset and is read from the storage means immediately after the mode change has occurred.

25. Electronic equipment according to claim 24, wherein the command to change between said modes is generated in response to the registration of a clock monitor fail within the microprocessor (300) and the issuance of a STOP instruction by a module of code.

26. Electronic equipment according to claim 24, wherein the command to change between said modes is generated in response to the enablement of a watchdog timer circuit and the prevention of a software reset of the watchdog timer.

27. Electronic equipment according to claim 24, wherein the command to change between said modes is generated in response to the detection of an illegal op-code at a specific, designated location within a module of code.

28. Electronic equipment according to claim 24, wherein the command to change between said modes is generated in response to the initialisation of a mode select means and the activation of a coupled microprocessor reset input means.

29. Electronic equipment according to claim 23, wherein means are provided for writing a vector, representing a desired start location for a new operating mode, to the internal volatile memory of the microprocessor prior to the initialization of the forced micro-reset and then immediately reading the vector after the mode change has occurred.

30. Electronic equipment according to claims 29, wherein
the vector is uniquely defined by the command received from each specific input means.

31. Electronic equipment according to claim 30, wherein
the vector contains a routine which accesses a first module of code which re-initiates the microprocessor and then initiates a desired second module of code.

32. A method for reducing the effect of locally generated noise in a radio having radio receiver susceptible to generated noise to a high degree, radio transmitter susceptible to generated noise to a lesser degree, a microprocessor with internal memory, a central processing unit, and internal buses coupled between said memory and said processing unit and having memory external to said microprocessor and external buses, for external addressing coupled between said memory external to said microprocessor and said microprocessor; method comprising the steps of:
  a) providing modules of program code;
  b) partitioning said modules of program code into:
    i) first category routines which, when in operation are related to radio receiver functions; and
    ii) second category routines which, when in operation, are related to radio transmitter functions, radio mode change functions and user interaction functions;
  c) storing at least temporaneously the first category routines in memory internal to said microprocessor;
  d) storing the second category routines in memory external to said microprocessor;
  e) operating said microprocessor selectively in single chip mode in which the microprocessor restricts itself to internal operation between said internal memory, said processing unit and said internal buses and thereby inhibits addressing on the external buses and reduces locally generated noise; and in an expanded mode in which the microprocessor performs operation on the external bus;
  f) executing said first category routines for controlling said radio receiver while said microprocessor is operating in said single chip mode; and
  g) executing said second category routines for controlling said radio transmitter while said microprocessor is operating in said expanded mode.

33. A method for reducing the effect of locally generated noise in electronic equipment having first portion susceptible to generated noise to a high degree, second portion susceptible to generated noise to a lesser degree, a microprocessor with internal memory, memory external to said microprocessor, and external buses, for external addressing, coupled between said memory external to said microprocessor and said microprocessor, said microprocessor having internal memory, a central processing unit and internal buses coupled between said memory and said processing unit; the method comprising the steps of:
  a) providing modules of program code
  b) partitioning said modules of program code into:
    i) first category routines which, when in operation, are related to first portion functions affected by generated noise to a higher degree; and
    ii) second category routines which, when in operation are related to second portion functions affected by generated noise to a lesser degree;
  c) sub-dividing the first category routines into:
    i) primary first category algorithms comprising modules of first category code which are substantially continually operational; and
    ii) secondary first category algorithms comprising modules of first category code which are executed from time to time;
  d) permanently storing said primary first category algorithms in said internal memory of said microprocessor;
  e) initially storing said secondary first category algorithms in said memory external to said microprocessor;
  f) storing said second category routines in said memory external to said microprocessor;
  g) operating said microprocessor selectively in single chip mode in which the microprocessor restricts itself to internal operation between said internal memory, said processing unit and said internal buses and thereby inhibits addressing on the external buses and reduces locally generated noise; and in an expanded mode in which the microprocessor performs operation on the external bus;
  h) executing said primary first category routines for controlling said first portion while said microprocessor is operating in said single chip mode; and
  i) executing said second category routines for controlling said second portion while said microprocessor is operating in said expanded mode; and
  j) loading said secondary first category routines into said internal memory and executing said secondary first category routines for controlling said first portion while said microprocessor is operating in said single chip mode.

* * * * *